US006433898B1

(12) United States Patent
Bestmann

(10) Patent No.: US 6,433,898 B1
(45) Date of Patent: Aug. 13, 2002

(54) METHOD AND APPARATUS FOR THE CONVERSION OF COLOR VALUES

(75) Inventor: Günter Bestmann, Altenholz (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

(21) Appl. No.: 09/011,105

(22) PCT Filed: Aug. 16, 1996

(86) PCT No.: PCT/DE96/01536

§ 371 (c)(1),
(2), (4) Date: May 28, 1998

(87) PCT Pub. No.: WO97/08886

PCT Pub. Date: Mar. 6, 1997

(30) Foreign Application Priority Data

Aug. 26, 1995 (DE) .......................................... 195 31 390

(51) Int. Cl.[7] .............................. H04N 1/00; G06K 9/00
(52) U.S. Cl. ........................ 358/518; 358/520; 358/458; 382/168
(58) Field of Search ................................. 358/505, 506, 358/518, 519, 520, 521, 522, 523, 524, 455, 456, 457, 458; 382/167, 168, 274, 169

(56) References Cited

U.S. PATENT DOCUMENTS

| 4,649,422 A | * | 3/1987 | Rauskolb et al. ............ 358/504 |
| 4,745,489 A | * | 5/1988 | Kashiwagi et al. .......... 358/296 |
| 4,797,712 A | * | 1/1989 | Hayashi et al. ................ 355/38 |
| 4,802,107 A | | 1/1989 | Yamamoto et al. |
| 5,053,888 A | * | 10/1991 | Nomura ........................ 358/458 |
| 5,313,310 A | * | 5/1994 | Numakura et al. .......... 358/456 |
| 5,412,737 A | * | 5/1995 | Govrin ........................ 382/168 |
| 5,668,890 A | * | 9/1997 | Winkelman .................. 382/167 |
| 5,680,477 A | * | 10/1997 | Asada .......................... 382/169 |
| 5,790,707 A | * | 8/1998 | Tanaka et al. ............... 382/274 |
| 5,801,745 A | * | 9/1998 | Wada et al. .................. 347/232 |

FOREIGN PATENT DOCUMENTS

| DE | 37 29 188 A1 | 3/1988 |
| GB | 2 191 655 A | 12/1987 |

OTHER PUBLICATIONS

Patent Abstracts of Japan—JP 63040492—20-02-88—vol. 12, No. 254 (E–634)—Color Picture Processor.

* cited by examiner

Primary Examiner—Edward Coles
Assistant Examiner—Joseph R. Pokrzywa
(74) Attorney, Agent, or Firm—Schiff Hardin & Waite

(57) ABSTRACT

In a method and apparatus for conversion of color values of a color negative according to a positive/negative reversal function $[R_p, G_p, B_p=f(R_n, G_n, B_n)]$ color values $(R_n, G_n, B_n)$ for the three color components are acquired by optoelectronic scanning of a color negative in a color scanner. The image luminance value $(BL_r, BL_g, BL_b)$ and the image depth value $(BT_r, BT_g, BT_b)$ of the color negative as well as the corresponding density ranges $(\Delta D_r, \Delta D_g, \Delta D_b)$ are determined from the color values $(R_n, G_n, B_n)$ in an image analysis unit for each color component. The positive/negative reversal function is determined in a calculating stage from the density ranges $(\Delta D_r, \Delta D_g, \Delta D_b)$ and a defined density range $(\Delta D')$. The positive/negative reversal function is deposited in a table memory as a value table. The color values $(R_n, G_n, B_n)$ of the color negative are then converted into the color values $(R_p, G_p, B_p)$ of the corresponding color positive with the stored value table.

17 Claims, 4 Drawing Sheets

METHOD AND APPARATUS FOR THE CONVERSION OF COLOR VALUES

BACKGROUND OF THE INVENTION

The invention is in the field of electronic reproduction technology and is directed to a method and to an apparatus for the conversion of color values of a color negative with a negative/positive reversal function in the optoelectronic scanning of color negatives in devices and systems for electronic image processing.

Electronic image processing is composed essentially of the steps of image input, image processing and image output.

In the image input, for example with a color image scanner, three analog color value signals (R,G,B) are acquired by trichromatic as well as pixel-by-pixel and line-by-line optoelectronic scanning of a color original to be reproduced, whereby each color value triad (R,G,B) represents the color parts "red" (R), "green (G) and "blue" (B) of a pixel scanned in the color original. The analog color value signals are converted into digital color values and stored for the following image processing.

In the image processing, the color values (R,G,B) are usually first converted into color separation values (C,M,Y, K) according to the laws of subtractive color mixing, these color separation values (C,M,Y,K) being a criterion for the dosing of the inks "cyan" (C), "magenta" (M), "yellow" (y) and "black" (K) or, respectively, for the raster percentages used in the later printing process. At the same time, local or selective color corrections can also be undertaken under visual control on a color monitor in the image processing, with the goal of improving the color image reproduction or undertaking editorial color changes.

After the image processing, the image output occurs with a suitable output unit, for example an exposer or recorder, by pixel-by-pixel exposure of the color image to be reproduced on a recording material, from which the printing forms for the multicolor printing of the color image are then produced.

The color originals to be scanned are usually color reversal films (slides) or color negatives. A color reversal film can be directly viewed after being developed, since it supplies a chromatically correct image of the original. The color values ($R_p$, $G_p$, $B_p$) generated in the scanning of the color reversal film can therefore be directly employed for the color image evaluation of a color reversal film on a color monitor or for the drive of the color monitor after a color correction. A color negative, by contrast, does not supply a chromatically correct image of the original after being developed. It is only possible to view the photographed subject in correct colors after a copying of the color negative onto a special positive paper. A negative/positive reversal function must therefore be determined first for the color image evaluation of a color negative on a color monitor, and the color values ($R_n$, $G_n$, $B_n$) acquired in the scanning of the color negative must be converted into color values ($R_p$, $G_p$, $B_p$) representing the corresponding positive image on the basis of the identified negative/positive reversal function ($R_p$, $G_p$, $B_n$)=f($R_n$, $G_n$, $B_p$) for the drive of the color monitor.

A method for determining a negative/positive reversal function is already known from the publication, H. Lang, *Farbmetrik und Farbfernsehen*, R. Oldenbourg Verlag, Munich, Vienna, 1978, ISBN 3-486-20661-3, Chapter 23, "Elektronische Farbumkehr und Farbkorrektur, pages 414 through 427.

A color negative film comprises three individual film layers, namely a blue-sensitive yellow layer, a green-sensitive magenta layer and a red-sensitive cyan layer. Each film layer is characterized by a color density curve $D_r=f(E_r)$, $D_g=f(E_g)$ and $D_b=f(E_b)$, these indicating the relationship between the light quantities ($E_r$, $E_g$, $E_b$) acting on the color negative film and the color densities ($D_r$, $D_g$, $D_b$) respectively achieved in the individual film layers. In a color negative film, there is a linear relationship in a broad range between the influencing light quantities ($E_r$, $E_g$, $E_b$) and the densities ($D_r$, $D_g$, $D_b$) achieved after developing the film, since the slopes ($\gamma_n$) of the film density curves, i.e. the gradation, are nearly linear in the usable value range. The slopes ($\gamma_n$) are also positive, so that a great light quantity corresponds to a high density in the film layer and, thus, to a low degree of transmission. As a result of the color masking of the color negative film, with which the color falsifications caused by the secondary color densities in the film layers are corrected, the three color density curves $D_r=f(E_r)$, $D_g=f(E_g)$ and $D_b=f(E_b)$ do not lie on top of one another, so that the density values ($D_r$, $D_g$, $D_b$) respectively exhibit an offset value ($\beta_r$, $\beta_g$, $\beta_b$), as a result whereof—for example in the exposure of a gray scale value—three different color density values ($D_r$, $D_g$, $D_b$) arise.

In the known method for the conversion of color values of a color negative according to a negative/positive reversal function ($R_p$, $G_p$, $B_p$)=f($R_n$, $G_n$, $B_n$), the color values ($R_n$, $G_n$, $B_n$) acquired, for example, by optoelectronic scanning with a color scanner are first logarithmized, intensified by a gain factor ($\alpha_r$, $\alpha_g$, $\alpha_b$), are then inverted with the explained parameters ($\gamma_n$, $\beta_r$, $\beta_g$, $\beta_b$) of the color density curves, and are subsequently in turn delogarithmized in order to obtain the color values ($R_p$, $G_p$, $B_p$). These conversion steps ensue combined according to the following approximate relationships:

$$R_p = \alpha_r * R_n^{-\gamma n} + \beta_r$$

$$G_p = \alpha_g * G_n^{-\gamma n} + \beta_g$$

$$B_p = \alpha_b * B_n^{-\gamma n} + \beta_b$$

In the known procedure, these relationships are realized by simple electrical circuits. The parameters ($\alpha$, $\beta$, $\gamma$) of the color density curves are thereby varied by manually actuatable controllers, whereby the offset values ($\beta$) are often ignored and the slopes ($\gamma$) of the color density curves identically prescribed for all three color parts. As a result thereof, the color reversal is ultimately controlled only via the gain factors ($\alpha$), whereby the gain factors are often interactively determined at the color monitor or by light measurement in an original.

GB-A-2191955 already discloses a method for the conversion of color values of a color negative wherein color values (R,G,B) are first logarithmized into color density signals, are digitized into color density data and intermediately stored. After the intermediate storing, the color density data are then color-corrected with a first look-up table (LUT) and are subsequently modified according to a negative/positive reversal function stored in a second look-up table. The modified color density data are converted into analog color density values and displayed on a color monitor. The acquisition of a negative/positive reversal function on the basis on the image luminance value and on the basis of the image depth value of a color negative, which are determined by an image analysis of the color negative as well as on the basis of calculated and defined density regions of the color negative, is not disclosed.

JP-A-6304092 is directed to a color image processing means in which the image luminance value and the image depth value of a color image are determined from the color signals (R,G,B) in order to acquire an optimum gradation curve therefrom. The acquisition of a negative/positive reversal function on the basis of the image luminance value and of the image depth value of a color negative, which are determined by an image analysis of the color negative as well as on the basis of calculated and defined density regions of the color negative, is not disclosed.

DE-A-3729188 discloses a color film inspection device for the display of color images on a color monitor, whereby color density data are acquired, the are subjected to a color and gradation correction, and the corrected color density values are supplied to a color monitor. The relationships between image luminance values, image depth values, density regions and a negative/positive reversal function resulting therefrom are not disclosed.

The traditional methods for the conversion of the color values of color negatives according to a negative/positive reversal function and for the determination of the negative/positive reversal function are based essentially on manual settings of color values with simplified parameters, so that no optimum color value conversion and, thus, reproduction quality is achieved. The results in the color value conversion can in fact be improved by subsequent color corrections in the following image processing, for example by a means color cast correction or a gradation correction, however this procedure is involved.

SUMMARY OF THE INVENTION

The invention is therefore based on the object of improving a method and a unit for the conversion of the color values of color negatives with a negative/positive reversal function such that a high precision is achieved in the color reversal for the purpose of achieving a good reproduction quality, and wherein the method will sequence automatically in order to relieve the operator of routine manual jobs.

According to the method and apparatus of the present invention for conversion of color values of a color negative with a positive/negative reversal function, color values are acquired for three color components by point-by-point and line-by-line, opto-electronic scanning of a colored negative. These color values are stored. A brightest color value as an image luminance value and a darkest color, value as an image depth value of the color negative are determined separately from the color values for each color component. Density ranges are determined for each color component by difference formation between corresponding image luminance values and image depth values of the color negative. The density range is defined by difference formation between a predetermined density value for image luminance and a predetermined density value for image depth. A positive/negative reversal function for conversion of the color values of the color negative into color values of a corresponding, chromatically correct color positive is determined from the three density ranges of the color negative and the defined density range. The functionally corresponding color values of the color positive are calculated for a value range of the color values of the color negative with the positive/negative reversal function. The functionally corresponding color values are deposited in a table memory addressable by the corresponding color values. The color values of the color negative are converted with the table memory into the color values of the corresponding color positive for further processing.

The invention is explained in greater detail below on the basis of FIGS. 1 through 6.

DESCRIPTION OF THE PREFERRED EMBODIMENTS

Figure 1:
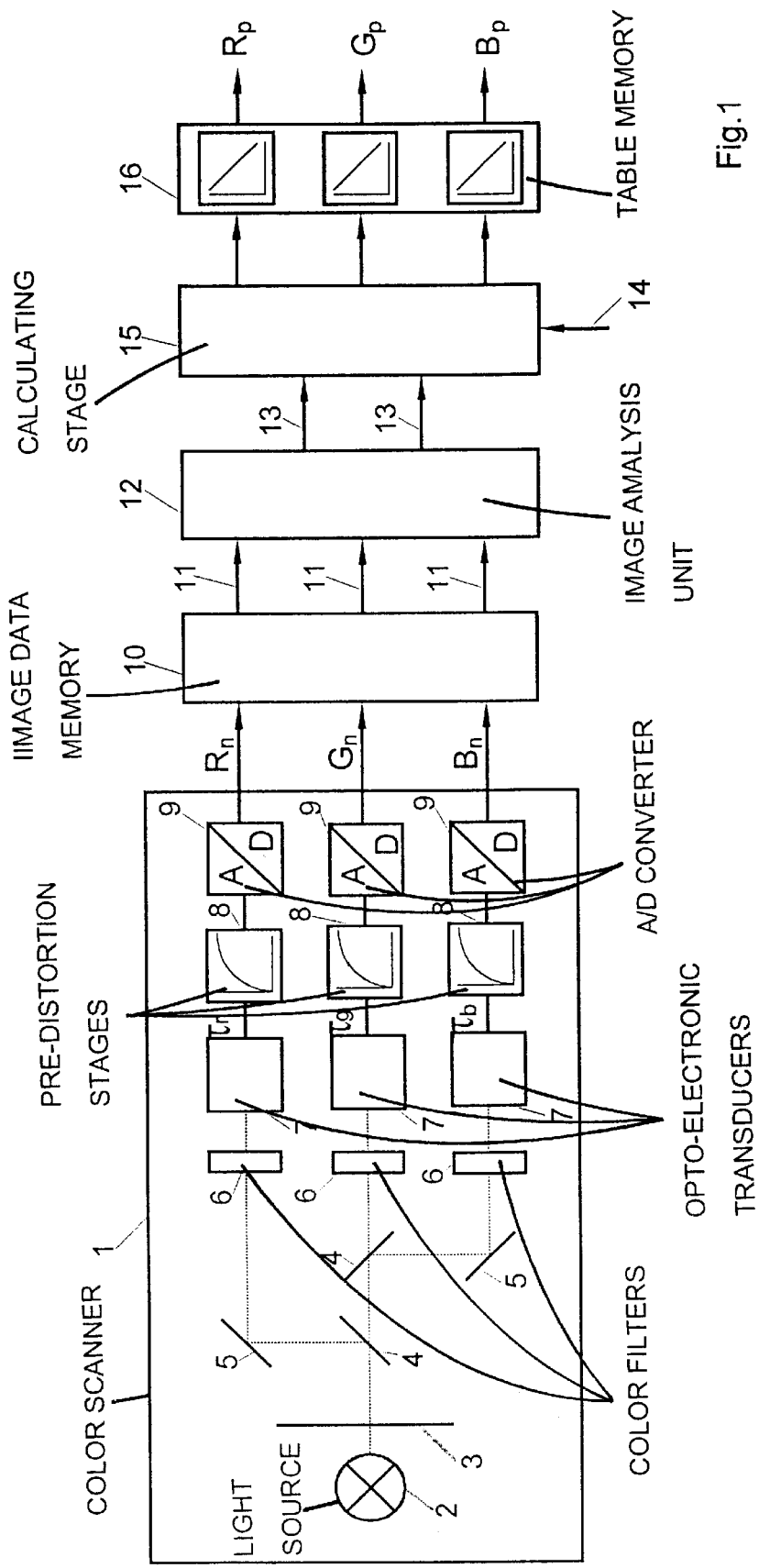
FIG. 1 is a schematic block circuit diagram of a unit for the determination of a negative/positive reversal function.

FIG. 1 shows a schematic block circuit diagram of a unit for the determination of a negative/positive reversal function $(R_p, G_p, B_p)=f(R_n, G_n, B_n)$ for the conversion of the color values $(R_n, G_n, B_n)$ of color negatives. The apparatus comprises a color scanner 1 for the pixel-by-pixel and line-byline, trichromatic scanning of color negatives. A light source 2 illuminates a color negative 3 point-by-point and line-by-line due to a relative motion between light source 2 and color negative 3. The scan light allowed to pass by the transparent color negative 3 and, modulated with the image content of the color negative 3, is divided into three sub-beams of different spectral composition with a beam splitter block, composed of two dichroitic mirrors (4) and two plane mirrors (5), and with three color filters (6). The three sub-beams are supplied to three separate color channels. The different color components "red" (R), "green" (G) and "blue" (B) of the three sub-beams are converted by opto-electronic transducers 7 in the three color channels into analog transmission values $(\tau_r, \tau_g, \tau_b)$ representative of the scanned color negative 3. The range of dynamics of the transmission values $(\tau_r, \tau_g, \tau_b)$ amounts to about 1 to 2 powers of ten. On the basis of a signal pre-distortion matched to the visual brightness sensation, the range of dynamics can be adapted as needed to the signal resolution of, for example, 8 bits standard in digital image processing. For that purpose, the transmission values $(\tau_r, \tau_g, \tau_b)$ are converted into the color values $(R_n, G_n, B_n)$ in the pre-distortion stages (8) according to the relationships $R_n=f(\tau_r)$, $G_n=f(\tau_g)$ and $B_n=f(\tau_b)$ When no pre-distortion occurs, $R_n=\tau_r, G_n=\tau_g$ and $B_n=\tau_b$ apply. The color values $(R_n, G_n, B_n)$ are then converted in A/D converters (9) into digital color values $(R_n, G_n, B_n)$ that are then intermediately stored in an image data memory 10 of an image processing system for the subsequent image processing. The digitization in the A/D converters (9) is thereby undertaken such that the digital color value 0 corresponds to the "absolute black" (transmission value τ=0.0) and the digital color value 255 corresponds to the "reference white" (transmission value τ=1.0).

The color values $(R_n, G_n, B_n)$ generated in the color scanner (1) and intermediately stored in the image data memory (10) are then supplied via lines (11) to an image analysis unit (12). An automatic image analysis for determining the maximum brightness values, the image luminance values $(BL_r, BL_g, Bl_b)$, and the minimum brightness values, the image depth values $(BT_r, BT_g, BT_b)$, of the color negative is implemented in the image analysis unit (12) separately for each color channel on the basis of the color values $(R_n, G_n, B_n)$ of the respectively scanned color negative 3. The distances between the image luminance values $(BL_r, BL_g, BL_b)$ and the image depth values $(BT_r, BT_g, BT_b)$ define the respective density ranges $\Delta D_r=(BL_r-BT_r)$, $\Delta D_g=(BL_g-BT_g)$ and $\Delta D_b=(BL_b-BT_b)$ of the three color components "red", "green" and "blue" of the color negative 3.

The image luminance values on line 13 ($BL_r$, $BL_g$, $BL_b$) and the image depth values on line 13 ($BT_r$, $BT_g$, $BT_b$) as well as prescribable density values on line 14 ($D^L$, $D^T$) for image luminance and image depth, which define a normed density range $\Delta D' = (D^{L-DT})$ are supplied to a calculating stage (15) in which the parameters of the negative/positive reversal function ($R_p$, $G_p$, $B_p$)=f($R_n$, $G_n$, $B_n$) are calculated taking the image luminance values ($BL_r$, $BL_g$, $BL_b$,), the image depth values ($BT_r$, $BT_g$, $BT_b$) and the prescribed density values ($D^L$–$D^T$) for image luminance and image depth into consideration. The output color values ($R_p$, $G_p$, $B_p$) determined for a possible value range of the input color values ($R_n$, $G_n$, $B_n$) according to the negative/positive reversal function ($R_p$, $G_p$, $B_p$)=f($R_n$, $G_n$, $B_n$) are then deposited for further employment as an addressable value table in a table memory (16), also called LUT=look-up table.

The method for the conversion of the color values of a color negative (3) and for determining the negative/positive reversal function ($R_p$, $G_p$, $B_p$)=f($R_n$, $G_n$, $B_n$) required therefore is described in greater detail below with reference to the Figures.

In a first method step [A], the color negative (3) to be reproduced is scanned point-by-point and line-by-line as well as trichromatically in the color scanner according to FIG. 1, and the color values ($R_n$, $G_n$, $B_n$) thereby acquired are deposited in the image data memory (10).

In a second method step [B], an image analysis of the color negative (3) is implemented in the image analysis unit (12) separately for the three color parts or, respectively, color channels for determining the respectively brightest color value, the image luminance value ($BL_r$, $BL_g$ or, respectively, $BL_b$) and the respectively darkest color value, the image depth value ($BT_r$, $BT_g$ or, respectively, $BT_b$).

The determination of the image luminance values ($BL_r$, $BL_g$, $BL_b$) and the image depth values ($BT_r$, $BT_g$, $BT_b$) can be implemented according to one of the known methods for automatic image analysis, preferably, however, according to the method disclosed by DE-C-43 09 879 for the determination of the image gradation, i.e. the distance between the image luminance value ($L_{max}$) and the image depth value ($L_{min}$), of an image.

In the method disclosed by DE-C43 09 879, the color values (R,G,B) of the RGB color space are transformed into corresponding color values (L, a, b) of the LAB color space and the determination of the image luminance values ($L_{max}$) and the image depth values ($L_{min}$) is implemented with the transformed brightness values (L) in that, first, the frequency distribution H(L) of the luminance values (L) is determined as a luminance histogram and—in the luminance histogram H(L)—the limits of a possible image luminance range in which the image luminance value ($L_{max}$) should lie and the limits of a possible image depth region in which the image depth value ($L_{min}$) should lie are then determined by characteristic brightness values (check points). Then, the image luminance value ($L_{max}$) is calculated from the curve of the luminance histogram H(L) within an expanded luminance region around the image luminance range, and the image depth value ($L_{min}$) is calculated from the curve of the luminance histogram H(L) within an expanded luminance region around the image depth range. In particular, this image analysis method has the advantage that artifacts such as detail contrast contours, specks of dust, edge regions, etc., in the color negative are taken into consideration, as a result whereof the determination of the image luminance and image depth values occurs with high precision.

Given application of the image analysis method disclosed by DE-C43 09 879 to a color negative 3, the color values ($R_n$, $G_n$, $B_n$) of the corresponding color negative 3 are successively analyzed instead of the luminance value (L), whereby attention must be paid that the brightest color value in the color negative 3 corresponds to the darkest color value in the original and the darkest color value in the color negative 3 corresponds to the brightest color value in the original.

All color data required for the reproduction of a color negative 3 are usually not required for the implementation of the image analysis; rather, it suffices to employ a lower number of color data of the color negative 3, what are referred to as coarse image data. For acquiring the coarse image data for the image analysis of, for example, 512×512 pixels of the color negative, the color negative is scanned in the color scanner with a coarser resolution (coarse scan) than the resolution required for the reproduction (fine scan), and the coarse image data acquired in this way are deposited in the image data memory 10. In order to avoid an additional coarse scan, the coarse image data required for the image analysis can also be generated from the fine image data that are generated by a fine scan of the color negative 3 and deposited in the image data memory 10.

Alternatively to the automatic image analysis, the image luminance values ($BL_r$, $BL_g$, $BL_b$) and the image depth values ($BT_r$, $BT_g$, $BT_b$) can also be determined in that the color negative 3 is displayed on a color monitor, the brightest and the darkest image location are marked, and the corresponding color values are measured.

In a third method step [C], the parameters of the negative/positive reversal function ($R_p$, $G_p$, $B_p$)=f($R_n$, $G_n$, $B_n$) are determined in the calculating stage 15 taking the image luminance values ($BL_r$, $BL_g$, $BL_b$) and the image depth values ($BT_r$, $BT_g$, $BT_b$) determined in method step [B] as well as the prescribed density values $D^L$, $D^T$) for image luminance and image depth into consideration, and the functionally allocated output color values ($R_p$, $G_p$, $B_p$) are subsequently calculated for the possible value range of the input color values ($R_n$, $G_n$, $B_n$). Method step [C] is implemented in the following individual steps.

In a step [C1], the density values ($D_r$, $D_g$, $D_b$) are first calculated according to Equations [1] by logarithmization of the transmission values ($\tau_r$, $\tau_g$, $\tau_b$) acquired in the scanning of the color negative 3 in the color scanner.

$$D_r = -\log \tau_r$$
$$D_g = -\log \tau_g$$
$$D_b = -\log \tau_b \quad [1]$$

Given a resolution of 8 bits, the transmission values ($\tau_r$, $\tau_g$, $\tau_b$) are thereby normed according to the relationships $\tau_r = R_n/R_{max}$, $\tau_g = G_n/G_{max}$ and $\tau_b = B_n/B_{max}$ with $R_{max} = G_{max} = B_{max}$=such that the transmission values are $\tau_r = \tau_g = \tau_b = 0.0$ given the color values $R_n = G_n = B_n = 0$ and $\tau_r = \tau_g = \tau_b = 1.0$ given the color values $R_n = G_n = B_n = 255$.

When the color values ($R_n$, $G_n$, $B_n$) are pre-distorted in the predistortion stages (8) of the color scanner (1) in FIG. 1, the predistortion must be reversed before the further-processing of the color values according to the relationships $\tau_r = f^{-1}(R_n)$, $\tau_g = f^{-1}(G_n)$ and $\tau_b = f^{-1}(B_n)$. When no predistortion previously occurred, $\tau_r = R_n$, $\tau_g = G_n$ and $\tau_b = B_n$ apply.

In a step [C2], the three different density range $\Delta D_r = (BL_r - BT_r)$, $\Delta D_{g=(BLg} - BT_g)$ and $\Delta D_b = (BL_b - BT_b)$ of the color components "red", "green" and "blue" of the color negative 3 determined by the image analysis are matched in terms of gradation to the defined, normed density range $\Delta D' = D^L - D^T$) by norming functions having the form D'=f (D), whereby, for example, $D^L=1.2$ and $D^T=0.4$ can be selected. This matching proceeds in the following way.

Equation [2] is generally valid for the gradation matching:

$$(D'-D^T)/(D^L-D^T)=(D-BT)/(BL-BT) \quad [2]$$

The general equation 2 solved for D' yields the density values $D'_r$, $D'_g$ and $D'_b$ for the color components "red", "green" and "blue" in the normed density region $\Delta D'$ according to Equations [3]:

$$D'_r=(D^L-D^T)/(BL_r-BT_r)*(D_r-BT_r)+D^T$$
$$D'_g=(D^L-D^T)/(BL_g-BT_g)*(D_g-BT_g)+D^T$$
$$D'_b=(D^L-D^T)/(BL_b-BT_b)*(D_b-BT_b)+D^T \quad [3]$$

As a result of the above-described gradation matching of the individual density ranges $\Delta D_r$, $\Delta D_g$ and $\Delta D_b$ of the color components "red", "green" and "blue" of the color negative 3 to the normed density region ($\Delta D'$), the three color density curves $D_r=f(E_r)$, $D_g=f(E_g)$ and $D_b=f(E_b)$ of the three color layers of the color negative 3 are combined to form a single color density curve having the general form $D'=f(D)$.

It was explained in the introduction to the specification that, due to the color masking of the color negative with which the color falsifications caused by the secondary color densities in the film layers are corrected, the three color density curves $D_r=f(E_r)$, $D_g=f(E_g)$ and $D_b=f(E_b)$ due not lie on top of one another, but exhibit an offset. The three above-described color density curves coincide as a result of the above-described gradation matching, this corresponding to an elimination of the offset and, thus, to a filtering of the color masking of the color negative out.

Figure 2C:
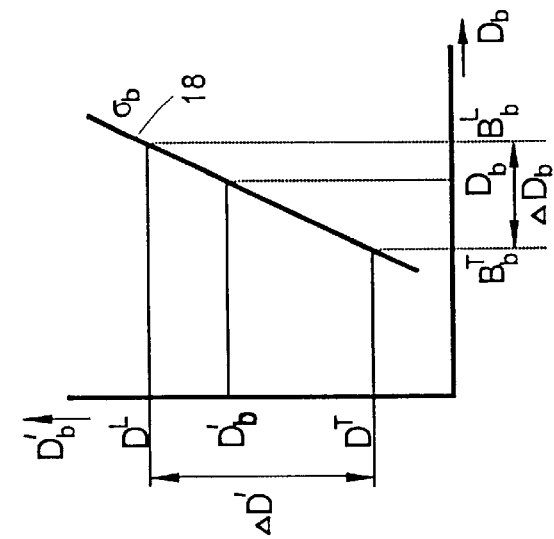
FIGS. 2A, 2B and 2C are diagrams relating to the norming and color mask correction.
Figure 2B:
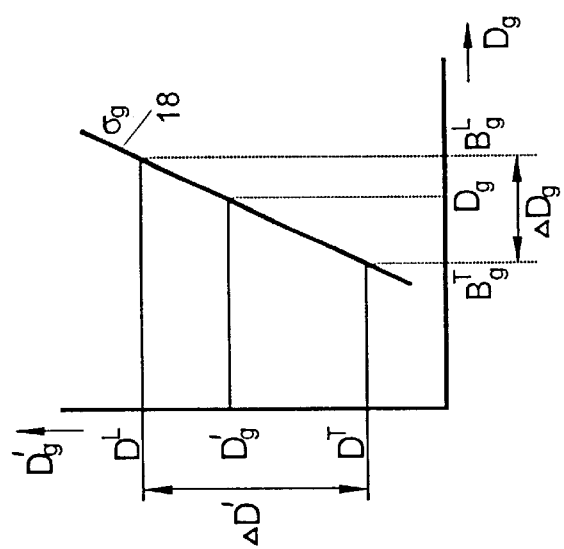
Figure 2A:
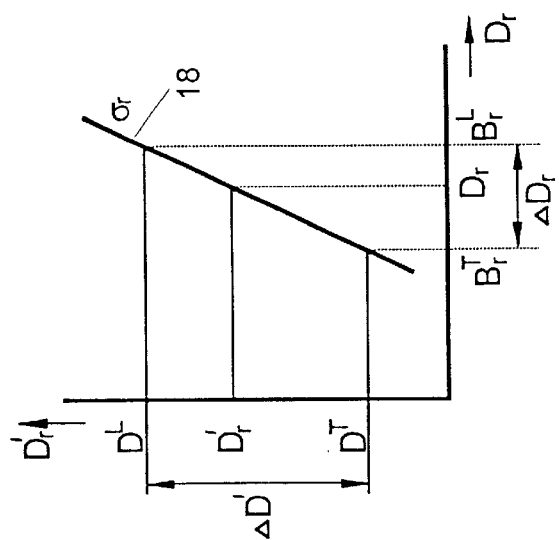

The gradation matching is shown in FIGS. 2a, 2b and 2c for the three color components "red", "green" and "blue", whereby the density values $D_r$, $D_g$ and $D_b$ of the color negative 3 are entered on the abscissas, the normed density values $D'_r$, $D'_g$ and $D'_b$ are entered on the ordinates, and the slopes of the norming lines 18 are referenced $\sigma_r$, $\sigma_g$ and $\sigma_b$.

Figure 3:
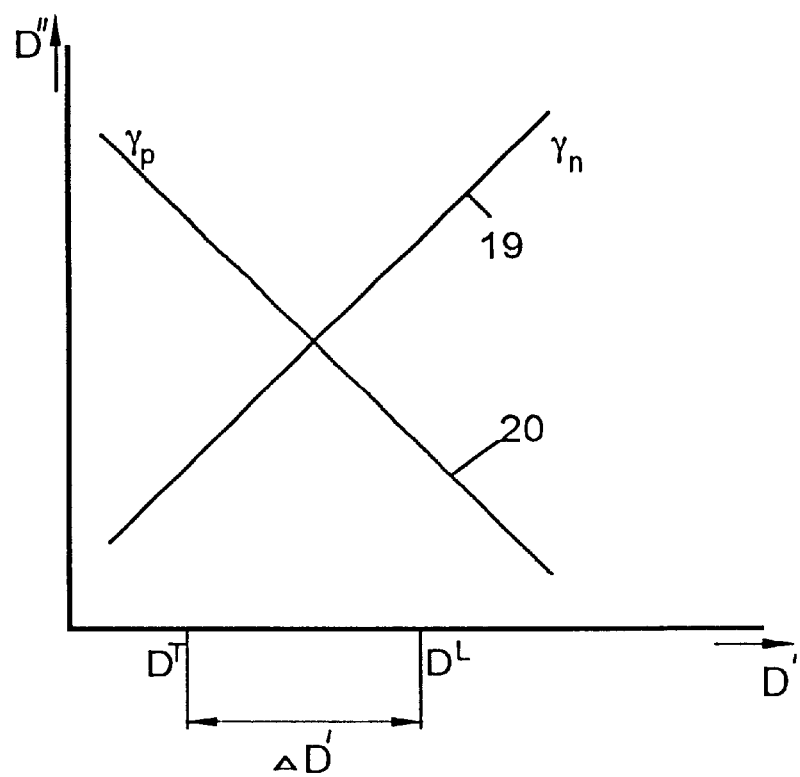
FIG. 3 shows a normed color density curve of a color negative.
Figure 4:
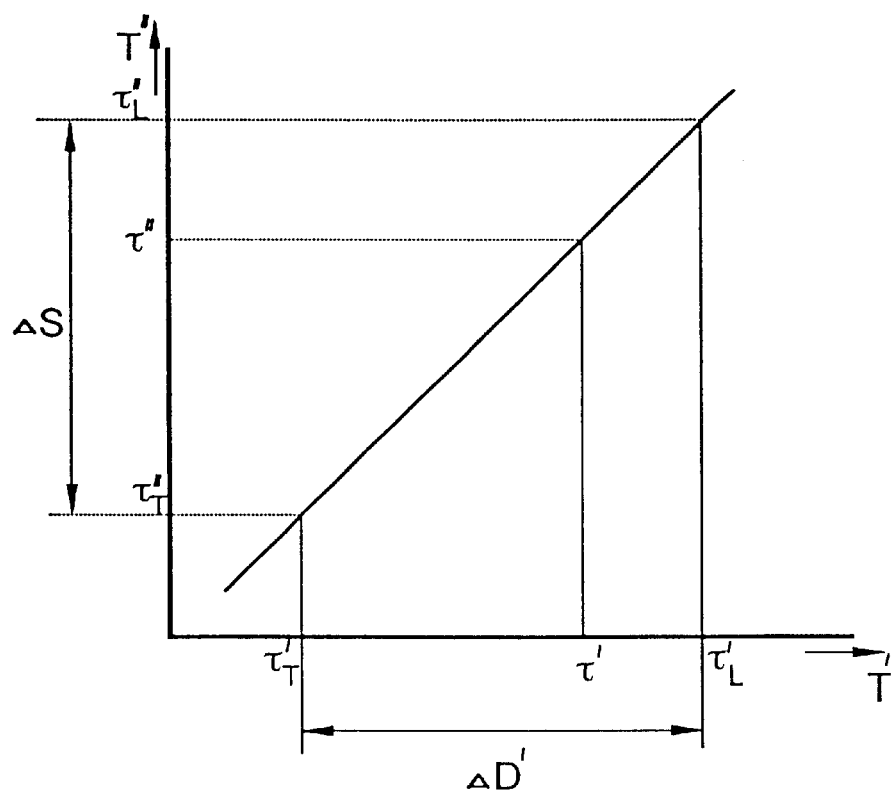
FIG. 4 is a further diagram relating to the gradation matching.

FIG. 3 shows the "normed" color density curve of a color negative 3 that is a straight line 19 with the slope ($\gamma_n$), at least in the normed density region. At the same time, the "inverse normed" color density curve is shown as a straight line (20) with the slope ($\gamma_p$) that corresponds to the color density curve of the positive material onto which the color negative must be copied in order to obtain a chromatically correct image. The relationship $\gamma_n*\gamma_p=1$ or, respectively, $\gamma_p1/\gamma_n$, with $\gamma_p=1.4$, exists between the slope ($\gamma_n$) of the "normed" color density curve of the color negative 3 and the slope ($\gamma_p$) of the "inverse normed" color density curve of the positive material.

A color reversal given simultaneous gradation matching occurs in a step [C3] in that the density values ($D'_r$, $D'_g$, $D'_b$) of the color negative are converted into corresponding inverse density values ($D''_r$, $D''_g$, $D''_b$) of the color positive with $\gamma_p=1/\gamma_n$ according to Equations [4] on the basis of the "normed" color density curve of FIG. 3.

$$D''_r=-\gamma_p*(D'_r-D^L)+D^T$$
$$D''_g=-\gamma_p*(D'_g-D^L)+D^T$$
$$D''_b=-\gamma_p*(D'_b-D^L)+D^T \quad [4]$$

The calculation of the transmission values ($\tau'_r$, $\tau'_g$, $\tau'_b$) according to Equations [5] ensues in a further step [C4] from the density values ($D''_r$, $D''_g$, $D''_b$) determined in the preceding step, this corresponding to a delogarithmization.

$$\tau'_r=10^{-D''_r}$$
$$\tau'_g=10^{-D''_g}$$
$$\tau'_b=10^{-D''_b} \quad [5]$$

The values determined in the steps [C1] through [C4] are expediently combined to form a new negative/positive reversal function having the general form $\tau'=f(\tau)$. Equations [6] are valid for the individual color components, "red", "green" and "blue":

$$\tau'_r=k_r*\tau_r^{-\sigma_r\gamma_p}$$
$$\tau'_g=k_g*\tau_g^{-\sigma_g\gamma_p}$$
$$\tau'_b=k_b*\tau_b^{-\sigma_b\gamma_p} \quad [6]$$

with the following abbreviations
for the "red" color component:

$$\sigma_r=(D^L-D^T)/(BL_r-BT_r)$$
$$k_r=10-\{\gamma_p\cdot(\sigma_r\cdot BT_r+D^L-D^T)-D^T\}$$

for the "green" color component:

$$\sigma_g=(D^L-D^T)/(BL_g-BT_g)$$
$$k_g=10-\{\gamma_p\cdot(\sigma_g\cdot BT_g+D^L-D^T)-D^T\}$$

for the "blue" color component:

$$\sigma_b=(D^L-D^T)/(BL_b-BT_b)$$
$$k_b=10-\{\gamma_p\cdot(\sigma_b\cdot BT_b+D^L-D^T)-D^T\}$$

$\sigma_r$, $\sigma_g$ and $\sigma_b$ are thereby the slopes of the straight lines 19 of the functions $D'=f(D)$ shown in FIGS. 2a, 2b and 2c.

A gradation matching of the density region $\Delta D'=D^L-D^T$) or, respectively, ($\tau'_L-\tau'_T$) defined by the selected density values ($D^L$ and $D^T$) to the signal or modulation range $\Delta S=(\tau''_L-\tau''_T)$ of an electronic unit that further-processes the values occurs in a further step [C5]. This gradation matching occurs according to the following, general Equation [6]:

$$(\tau''-\tau_T)/\tau_L-\tau_T)=(\tau'-\tau(D=\gamma_p*(D^L-D^T)+D^T))/(\tau(D=D^T)-\tau(D=\gamma_p*(D^L-D^T)+D^T)) \quad [6]$$

The following relationships according to Equations [7] derive from the general Equation [6] for the color components "red", "green" and "blue":

$$\tau''_r=(\tau_L-\tau_T)/(\tau(D=D^T)-\tau(D=\gamma_p*(D^L-D^T)+D^T))*(\tau'_r-\tau(D=\gamma_p*(D^L-D^T)+D^T))+\tau_T$$
$$\tau''_g=(\tau_L-\tau_T)/(\tau(D=D^T)-\tau(D=\gamma_p*(D^L-D^T)+D^T))*(\tau'_g-\tau(D=\gamma_p*(D^L-D^T)+D^T))+\tau_T$$
$$\tau''_b=(\tau_L-\tau_T)/(\tau(D=D^T)-\tau(D=\gamma_p*(D^L-D^T)+D^T))*(\tau'_b-\tau(D=\gamma_p*(D^L-D^T)+D^T))+\tau_T \quad [7]$$

The positive/negative reversal function having the general form $\tau''=f(\tau)$ derives from the combination of Equations [6] and [7]. The corresponding positive/negative reversal functions for the three color components "red", "green" and "blue" of the color negative 3 separately derive therefrom according to Equations [8] as follows:

$$\tau''_r=k'_r*\tau_r^{-\gamma r}+\epsilon'_r$$
$$\tau''_g=k'_g*\tau_g^{-\gamma g}+\epsilon'_g$$
$$\tau''_b=k'_b*\tau_b^{-\gamma b}+\epsilon'_b \quad [8]$$

with the following abbreviations for the "red" color component:

$$k'_r=(\tau_L-\tau_T)/(\tau(D=D^T)-\tau(D=\gamma_p*(D^L-D^T)+D^T)) *10-\gamma_p*(\sigma_r*BT_r+D^L-D^T)-D^T$$

$$\gamma'_r=\sigma_r*\gamma_p$$

$$\epsilon'_r=\tau_T-(\tau_L-\tau_T)/(\tau(D=D^T)-\tau(D=\gamma_p*(D^L-D^T)+D^T)) *\tau(D=\gamma_p*(D^L-D^T)+D^T)$$

for the "green" color component:

$$k'_g=(\tau_L-\tau_T)/(\tau(D=D^T)-\tau(D=\gamma_p*(D^L-D^T)+D^T)) *10-\gamma_p*(\sigma_g*BT_g+D^L-D^T)-D^T$$

$$\gamma'_g=\sigma_g*\gamma_p$$

$$\epsilon'_g=\tau_T-(\tau_L-\tau_T)/(\tau(D=D^T)-\tau(D=\gamma_p*(D^L-D^T)+D^T))*\tau(D=\gamma_p*(D^L-D^T)+D^T)$$

and for the "blue" color component:

$$k'_b=(\tau_L-\tau_T)/(\tau(D=D^T)-\tau(D=\gamma_p*(D^L-D^T)+D^T)) *10-\gamma_p*(\sigma_b*BT_b+D^L-D^T)-D^T$$

$$\gamma'_b=\sigma_b*\gamma_p$$

$$\epsilon'_b=\tau_T-(\tau_L-\tau_T)/(\tau(D=D^T)-\tau(D=\gamma_p*(D^L-D^T)+D^T))*\tau(D=\gamma_p*(D^L-D^T)+D^T)$$

When the color values ($R_n$, $G_n$, $B_n$) were pre-distorted in the pre-distortion stages 8 of the color scanner according to FIG. 1 and the pre-distortions were reversed in step [C1], the pre-distortions must in turn be calculated into the Equations [8] in the following way:

$$R_p=f(\tau''r)$$
$$G_p=f(\tau''_g)$$
$$B_p=f(\tau''_b) \quad [9]$$

When, by contrast, no pre-distortions occurred:

$$R_p=\tau''_r$$
$$G_p=\tau''_g$$
$$B_p=\tau''_b \quad [10]$$

In a fourth method step [D], finally, the functionally corresponding output color values ($R_p$, $G_p$, $B_p$) for the input color values ($R_n$, $G_n$, $B_n$) lying in the value range of the color negative, calculated according to the negative/positive reversal function ($R_p$, $G_p$, $B_p$)=f($R_n$, $G_n$, $B_n$) and addressable by the corresponding input color values ($R_n$, $G_n$, $B_n$), are deposited as a value table in the table memory 16. The table memory can be a component part of a color scanner or of an image processing system or can be connected following the color scanner.

A number of possibilities derive for editing the output color values ($R_p$, $G_p$, $B_p$) of the color negative 3 to be reproduced that are required for the subsequent image processing.

Figure 5:
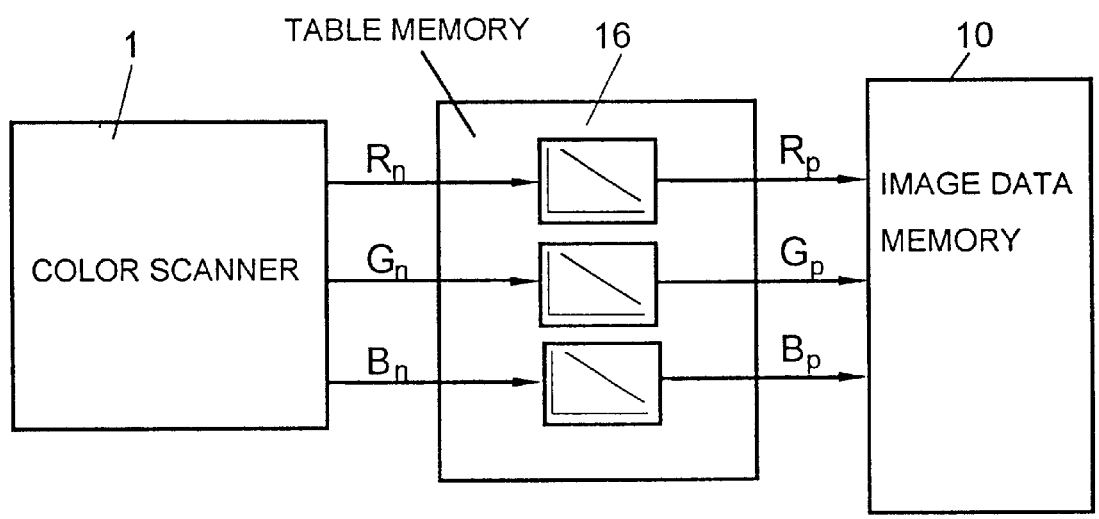
FIG. 5 is a schematic block circuit diagram of a unit for color value conversion for color negatives.

FIG. 5 shows a first exemplary embodiment of a unit for converting the input color values ($R_n$, $G_n$, $B_n$) of a color negative 3 into the output color values ($R_p$, $G_p$, $B_p$), whereby the filled table memory 16 follows the color scanner, and the color value conversion is implemented on-line in the fine scanning of a color negative 3. The color values ($R_p$, $G_p$, $B_p$) thereby acquired are then supplied to an image processing system for further processing, for example for the implementation of a color correction, and/or are supplied to a color monitor for the chromatically correct evaluation of the color negative 3.

Figure 6:
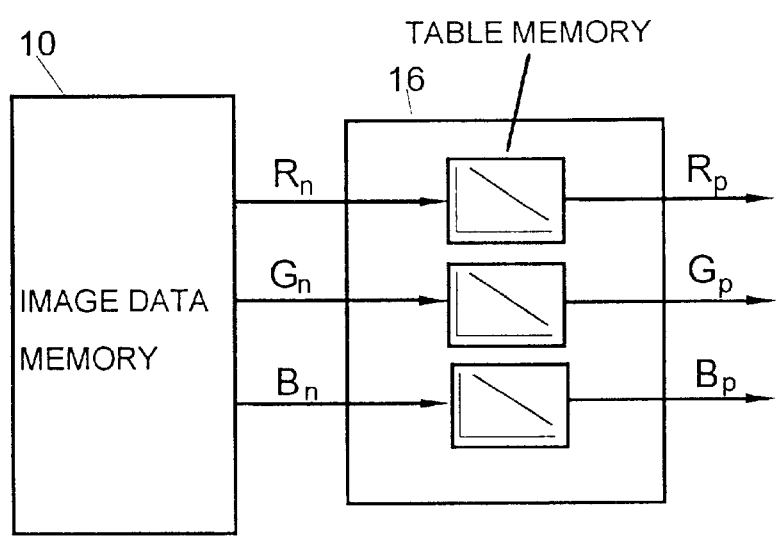
FIG. 6 is a further schematic block circuit diagram of a unit for the color value conversion for color negatives.

FIG. 6 shows a second exemplary embodiment of a unit for converting the input color values ($R_n$, $G_n$, $B_n$) of a color negative 3 into the output color values ($R_p$, $G_p$, $B_p$). When the color values ($R_n$, $G_n$, $B_n$) generated by a fine scan are deposited in the image data memory 10, the table memory (16) can also be connected following the image data memory (10). In this case, the input color values ($R_n$, $G_n$, $B_n$) stored in the image data memory 10 are converted into the output color values ($R_p$, $G_p$, $B_p$) in the table memory 16 and these are supplied for further processing in an image processing system.

Although various minor changes and modifications might be proposed by those skilled in the art, it will be understood that my wish is to include within the claims of the patent warranted hereon all such changes and modifications as reasonably come within my contribution to the art.

I claim:

1. A method for conversion of color values of a color negative with a positive/negative reversal function, comprising the steps of:

acquiring color values ($R_n$, $G_n$, $B_n$) for three color components by point-by-point and line-by-line, optoelectronic scanning of a color negative and storing the color values;

determining separately a brightest color value as an image luminance value ($BL_r$, $BL_g$, $BL_b$) and a darkest color value as an image depth value ($BT_r$, $BT_g$, $BT_b$) of the color negative from the color values ($R_n$, $G_n$, $B_n$) for each color component;

determining density ranges ($\Delta D_r$, $\Delta D_g$, $\Delta D_b$) for each color component by difference formation between the corresponding image luminance values ($BL_r$, $BL_g$, $BL_b$) and the image depth values ($BT_r$, $BT_g$, $BT_b$) of the color negative;

defining a density range ($\Delta D'$) by difference formation between a prescribed density value ($D^L$) for image luminance and a prescribed density value ($D^T$) for image depth;

determining a positive/negative reversal function {$R_p$, $G_p$, $B_p$=f($R_n$, $G_n$, $B_n$)} for conversion of the color values ($R_n$, $G_n$, $B_n$) of the color negative into color values ($R_p$, $G_p$, $B_p$) of a corresponding, chromatically correct color positive from the three density ranges ($\Delta D_r$, $\Delta D_g$, $\Delta D_b$) of the color negative and the defined density range ($\Delta D'$);

calculating functionally corresponding color values ($R_p$, $G_p$, $B_p$) of the color positive for a value range of the color values ($R_n$, $G_n$, $B_n$) of the color negative with the positive/negative reversal function {$R_p$, $G_p$, $B_p$=f($R_n$, $G_n$, $B_n$)} and depositing the color values ($R_p$, $G_p$, $B_p$) in a table memory addressable by the corresponding color values ($R_n$, $G_n$, $B_n$); and converting the color values ($R_n$, $G_n$, $B_n$) of the color negative with the table memory into the color values ($R_p$, $G_p$, $B_p$) of the corresponding color positive for further processing.

2. The method according to claim 1 wherein the image luminance values ($BL_r$, $BL_g$, $BL_b$) and the image depth values ($BT_r$, $BT_g$, $BT_b$) are determined by an automatic image analysis of the color negative separately for each color component, comprising the steps of:

determining the frequency distributions (H(R), H(G) and H(B)) of the color values (R, G, and B) as brightness histograms;

determining by characteristic brightness values in a luminance histogram limits of a possible image luminance range in which image luminance values ($BL_r$, $BL_g$ and $BL_b$) should lie and limits of a possible image depth range in which image depth values ($BT_r$, $BT_g$ and $BT_b$) should lie; and calculating from a curve of the luminance histogram within an expanded luminance range around the image luminance range the image luminance values ($BL_r$, $BL_g$ and $BL_b$) and from a curve of the luminance histogram within an expanded luminance range around the image depth range the image depth values ($BT_r$, $BT_g$ and $BT_b$).

3. The method according to claim 1 wherein the image analysis of the color negative occurs with color values ($R_n$, $G_n$, $B_n$) that are acquired by scanning the color negative with a coarser resolution as a course scan compared to a fine scan resolution required for the reproduction of the color negative.

4. The method according to claim 1 wherein:

the color negative is first scanned with a coarser resolution as a course scan compared to a fine scan resolution required for the reproduction of the color negative for the acquisition of the color values ($R_n$, $G_n$, $B_n$);

a value table is calculated for the table memory;

the color negative is scanned with the fine scan resolution required for the reproduction; and the color values ($R_n$, $G_n$, $B_n$) acquired in the fine scan are converted into the color values ($R_p$, $G_p$, $B_p$) for further processing.

5. A method for conversion of color values of a color negative with a positive/negative reversal function, comprising the steps of:

acquiring color values ($R_n$, $G_n$, $B_n$) for three color components by point-by-point and line-by-line, optoelectronic scanning of a color negative and storing the color values;

determining separately a brightest color value as an image luminance value ($BL_r$, $BL_g$, $BL_b$) and a darkest color value as an image depth value ($BT_r$, $BT_g$, $BT_b$) of the color negative from the color values ($R_n$, $G_n$, $B_n$) for each color component;

determining density ranges ($\Delta D_r$, $\Delta D_g$, $\Delta D_b$) for each color component by difference formation between the corresponding image luminance values ($BL_r$, $BL_g$, $BL_b$) and the image depth values ($BT_r$, $BT_g$, $BT_b$) of the color negative;

defining a density range ($\Delta D'$) by difference formation between a prescribed density value ($D^L$) for image luminance and a prescribed density value ($D^T$) for image depth;

determining a positive/negative reversal function $\{R_p, G_p, B_p=f(R_n, G_n, B_n)\}$ for conversion of the color values ($R_n$, $G_n$, $B_n$) of the color negative into color values ($R_p$, $G_p$, $B_p$) of a corresponding, chromatically correct color positive from the three density ranges ($\Delta D_r$, $\Delta D_g$, $\Delta D_b$) of the color negative and the defined density range ($\Delta D'$);

calculating functionally corresponding color values ($R_p$, $G_p$, $B_p$) of the color positive for a value range of the color values ($R_n$, $G_n$, $B_n$) of the color negative with the positive/negative reversal function $\{R_p, G_p, B_p=f(R_n, G_n, B_n)\}$ and depositing the color values ($R_p$, $G_p$, $B_p$) in a table memory addressable by the corresponding color values ($R_n$, $G_n$, $B_n$);

converting the color values ($R_n$, $G_n$, $B_n$) of the color negative with the table memory into the color values ($R_p$, $G_p$, $B_p$) of the corresponding color positive for further processing; and for determining the positive/negative reversal function $\{R_p, G_p, B_p=f(R_n, G_n, B_n)\}$, transmission values ($\tau_r$, $\tau_g$, $\tau_b$) acquired by scanning the color negative are logarithmized into density values ($D_r$, $D_g$, $D_b$), the three density ranges ($\Delta D_r$, $\Delta D_g$, $\Delta D_b$) of the color negative are matched to the defined density range ($\Delta D'$) via linear norming functions $\{D'_r=f_r(D_r), D'_g=f_g(D_g), D'_b=f_b(D_b)\}$, as a result of which the three color density curves of the color negative material are normed onto a color density curve with a slope ($\gamma_n$), a normed color density curve $[D'=f(D)]$ of the color negative material is converted into a normed inverse color density curve $[D''=f(D')]$ of a positive material with a slope $[\gamma_p=1/\gamma_n]$, inverse density values ($D''_r$, $D''_g$, $D''_b$) are calculated from the density values ($D'_r$, $D'_g$, $D'_b$) with the normed inverse color density curve $[D''=f(D')]$ according to a color reversal, the inverse density values ($D''_r$, $D''_g$, $D''_b$) are delogarithmized into transmission values ($\tau'_r$, $\tau'_g$, $\tau'_b$), the defined density range $\{\Delta D'\}$ is matched in gradation to a signal range $\{\Delta S=(\tau''_L-\tau''_T)\}$ defined by fixed points ($\tau''_L$, $\tau''_T$) and the positive/negative reversal function $\{R_p, G_p, B_p=f(R_n, G_n, B_n)\}$ is formed.

6. The method according to claim 5, wherein the calculation of the density values ($D_r$, $D_g$, $D_b$) sequences according to the following equations:

$$D_r=-\log \tau_r$$
$$D_g=-\log \tau_g$$
$$D_b=-\log \tau_b.$$

7. The method according to claim 5 wherein the determination of the density values ($D'_r$, $D'_g$, $D'_b$) sequences according to the following equations:

$$D'_r=(D^L-D^T)/(BL_r-BT_r)*(D_r-BT_r)+D^T$$
$$D'_g=(D^L-D^T)/(BL_g-BT_g)*(D_g-BT_g)+D^T$$
$$D'_b=(D^L-D^T)/(BL_b-BT_b)*(D_b-BT_b)+D^T.$$

8. The method according to claim 5 wherein the determination of the density values ($D''_r$, $D''_g$, $D''_b$) sequences according to the following equations $$D''_r=-\gamma_p*(D'_r-D^L)+D^T$$
$$D''_g=-\gamma_p*(D'_g-D^L)+D^T$$
$$D''_b=-\gamma_p*(D'_b-D^L)+D^T.$$

9. The method according to claim 5 wherein the delogarithmization sequences according to the following equations:

$$\tau'_r=10^{-D''_{[r]}r}$$
$$\tau'_g=10^{-D''_{[g]}g}$$
$$\tau'_b=10^{-D''_{[b]}b}.$$

10. The method according to claim 5 wherein the gradation matching sequences according to the following equations:

$$\tau''_r=(\tau_{L-\tau T})/(\tau(D=D^T)-\tau(D=\gamma_p*(D^L-D^T)+D^T))*(\tau'_r-\tau(D=\gamma_p*(D^L-D^T)+D^T))[+]\pm\tau_T$$

$\tau''_g = (\tau_L - \tau_T)/(\tau(D=D^T) - \tau(D=\gamma_p*(D^L-D^T)+D^T))*(\tau'_g - \tau(D=\gamma_p*(D^L-D^T)+D^T))[=]\pm\tau_T$ $\tau''_b = (\tau_L - \tau_T)/(\tau(D=D^T) - \tau(D=\gamma_p*(D^L-D^T)+D^T))*(\tau'_b - \tau(D=\gamma_p*(D^L-D^T)+D^T))[=]\pm\tau_T.$ 11. The method according to claim 5 wherein a positive/negative reversal function $\{\tau''_r, \tau''_g, \tau''_b \mathbf{32} \, f(\tau_r, \tau_g, \tau_b)\}$ is provided according to the following equations:

$\tau''_r = k'_r * \tau_r^{-\gamma'r} + \epsilon'_r$ $\tau''_g = k'_g * \tau_g^{-\gamma g'} + \epsilon'_g$ $\tau''_b = k'_b * \tau_b^{-\gamma b'} + \epsilon'_{b[.]}$ wherein $k'_{r=(\tau L - \tau_T)}/(\tau(D=D^T) - \tau(D=\gamma_p*(D^L-D^T)+D^T))*10\gamma_p*(\sigma_r*BT_r+D^L-D^T)-D^T$ $\gamma'_r = \sigma_r * \gamma_p$ $\sigma_r = (D^L-D^T)/(BL_r-BT_r)$ $\epsilon'_r = \tau_T - (\tau_L-\tau_T)/(\tau(D=D^T) - \tau(D=\gamma_p*(D^L-D^T)+D^T))*\tau(D=\gamma_p*(D^L-D^T)+D^T)$ and $k'_g = (\tau_L-\tau_T)/(\tau(D=D^T) - \tau(D=\gamma_p*(D^L-D^T)+D^T))*10-\gamma_p*(\sigma_g*BT_g+D^L-D^T)-D^T$ $\gamma'_g = \sigma_g * \gamma_p$ $\sigma_g = (D^L-D^T)/(BL_g-BL_g)$ $\epsilon'_g = \tau_T - (\tau_L-\tau_T)/(\tau(D=D^T) - \tau(D=\gamma_p*(D^L-D^T)+D^T))*\tau(D=\gamma_p*(D^L-D^T)+D^T)$ and $k'^b = (\tau_L-\tau_T)/(\tau(D=D^T) - \tau(D=\gamma_p*(D^L-D^T)+D^T))*10-\gamma_p*(\sigma_b*BT_b+D^L-D^T)-D^T$ $\gamma'_b = \sigma_b * \gamma_p$ $\sigma_{b=(D}{}^L-D^T)/(BL_b-BT_b)$ $\epsilon_b = \tau_T - (\tau_L-\tau_T)/(\tau(D=D^T) - \tau(D=\gamma_p*(D^L-D^T)+D^T))*\tau(D=\gamma_p*(D^L-D^T)+D^T).$ 12. The method according to claim 11 wherein transmission values ($\tau_r, \tau_g, \tau_b$) acquired in the scanning of the color negative are predistorted according to relationships $R_n=f(\tau_r)$, $G_n=f(\tau_g)$ and $B_n=f(\tau_b)$ in order to obtain the color values ($R_n, G_n, B_n$);

for calculating the positive-negative reversal function, the pre-distortions are in turn reversed according to relationships $\tau_r^{[r]}=f^1(R_n)$, $\tau_g=f^1(G_n)$ and $\tau_b=f^1(B_n)$ before logarithmization of the transmission values ($\tau_r, \tau_g, \tau_b$); and the pre-distortions are calculated back into the calculated positive/negative reversal function according to relationships $R_p=f(\tau''_r)$, $G_p=f(\tau''_g)$ and $B_p=f(\tau''_b)$.

13. A method for conversion of color values of a color negative with a positive/negative reversal function, comprising the steps of:

acquiring color values for three color components of a color negative;

determining a brightest color value as an image luminance value and a darkest color value as an image depth value of the color negative from the color values for each color component;

determining density ranges for each color component by difference formation between corresponding image luminance values and image depth values of the color negative;

defining a density range by difference formation between a predetermined density value for image luminance and a predetermined density value for image depth;

determining a positive/negative reversal function for conversion of the color values of the color negative into color values of a corresponding, chromatically correct color positive from the density ranges of the color negative and the defined density ranges;

calculating functionally corresponding color values of the color positive for a value range of the color values of the color negative with the positive/negative reversal function and depositing the functionally corresponding color values in a memory addressable by the corresponding color values; and converting the color values of the color negative with the memory into the color values of the corresponding color positive for further processing.

14. An apparatus for conversion of color values of a color negative with a positive/negative reversal function comprising:

an optoelectronic color scanner for acquiring color values ($R_n, G_n, B_n$) for three color components by point-by-point and line-by-scanning of a color negative;

an image data memory connected to the color scanner for intermediate storage of the color values ($R_n, G_n, B_n$);

an image analysis unit connected to the image data memory for separately determining a brightest color value as an image luminance value ($BL_r, BL_g, BL_b$), and a darkest color value as an image depth value ($BT_r, BT_g, BT_b$) of the color negative from the color values ($R_n, G_n, B_n$) for each color component;

a calculating stage connected to the image analysis unit for determining parameters of a positive/negative reversal function $\{R_p, G_p, B_p=f(R_n, G_n, B_n)\}$ conversion of the color values ($R_n, G_n, B_n$) of the color negative into corresponding color values ($R_p, G_p, B_p$) of a corresponding, chromatically correct color positive from the image luminance values ($BL_r, BL_g, BL_b$), the image depth values ($BT_r, BT_g, BT_b$), density ranges ($\Delta D_r, \Delta D_g, \Delta D_b$) representing a difference between the image luminance values ($BL_r, BL_g, BL_b$) and the image depth values ($BT_r, BT_g, BT_b$), prescribed density values ($D^L, D^T$) for image luminance and image depth, and a density range ($\Delta D'$) representing a difference between the prescribed density values ($D^L, D^T$) for image luminance and image depth, and for calculating functionally corresponding color values ($R_p, G_p, B_p$) of the color positive from the color values ($R_n, G_n, B_n$) of the color negative with the positive/negative reversal function; and a table memory following the calculating stage for depositing the calculated color values ($R_p, G_p, B_p$) and which is addressable by the corresponding color values ($R_n, G_n, B_n$).

15. The apparatus according to claim 14 wherein the table memory is connected following the color scanner in order to convert the color values ($R_n, G_n, B_n$) acquired in the scanning of the color negative into the color values ($R_p, G_p, B_p$) of the color positive with the positive/negative reversal function $\{R_p, G_p, B_p=f(R_n, G_n, B_n)\}$.

16. The apparatus according to claim 14 wherein the table memory is connected following the image data memory in order to convert the color values ($R_n, G_n, B_n$) acquired in the scanning of the color negative into the color values ($R_p, G_p, B_p$) of the color positive with the positive/negative reversal function $\{R_p, G_p, B_p=f(R_n, G_n, B_n)\}$.

17. An apparatus for conversion of color values of a color negative with a positive/negative reversal function comprising:

a unit for acquiring color values for three color components of a color negative;

an image analysis unit for determining a brightest color value as an image luminance value, and a darkest color value as an image depth value of the color negative from the color values for each color component;

a calculating stare connected to the image analysis unit for determining parameters of a positive/negative reversal function for conversion of the color values of the color negative into corresponding color values of a corresponding, chromatically correct color positive from the image luminance values, the image depth values, density ranges for each color component by difference formation between the corresponding image luminance values and the image depth values, prescribed density values for image luminance and image depth, and a density range representing a difference between said prescribed density values for image luminance and image depth, and for calculating functionally corresponding color values of the color positive from the color values of the color negative with the positive/negative reversal function; and a memory following, the calculating stage for depositing the calculated color values and which is addressable by the corresponding color values.

* * * * *